(12) United States Patent
Weigel

(10) Patent No.: US 6,287,016 B1
(45) Date of Patent: Sep. 11, 2001

(54) OPTICAL CONNECTOR AND OPTICAL CONNECTION

(75) Inventor: Hans-Dieter Weigel, Caputh (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/511,816

(22) Filed: Feb. 24, 2000

(30) Foreign Application Priority Data

Feb. 24, 1999 (DE) .............................................. 199 10 163

(51) Int. Cl.[7] .................................................... G02B 6/38
(52) U.S. Cl. ................... 385/58; 385/60; 385/88
(58) Field of Search ................... 385/88, 56, 58, 385/59, 60, 66, 68

(56) References Cited

U.S. PATENT DOCUMENTS

| | | | |
|---|---|---|---|
| 4,762,388 | * | 8/1988 | Tanaka et al. ..................... 350/96.2 |
| 5,073,042 | * | 12/1991 | Mulholland et al. .................. 385/69 |
| 5,838,855 | * | 11/1998 | Stephenson .......................... 385/53 |

FOREIGN PATENT DOCUMENTS

| | | |
|---|---|---|
| 2 312 015 | 9/1973 | (DE) . |
| 33 35 529 A1 | 4/1985 | (DE) . |
| 38 18 717 A1 | 12/1988 | (DE) . |
| 93 14 172.6 | 2/1994 | (DE) . |
| 43 11 980 C1 | 6/1994 | (DE) . |
| 93 20 829.4 | 4/1995 | (DE) . |
| 195 15 795 C2 | 11/1995 | (DE) . |
| 195 33 498 A1 | 3/1997 | (DE) . |
| 0 111 263 | 6/1984 | (EP) . |

* cited by examiner

Primary Examiner—Hung N. Ngo
(74) Attorney, Agent, or Firm—Herbert L. Lerner; Laurence A. Greenberg; Werner H. Stemer

(57) ABSTRACT

An optical connector serves for connecting a light wave conductor end to a coupling partner. An end of a freely disposed plug pin insertable into a receiver of the coupling partner is received for coupling. The connector has at least two catch arms, which hold the connector to the coupling partner in a connected state. The catch arms extend out from a foot end of the plug pin in a direction toward a front side of the plug pin and run at least in sections along the plug pin. An optical connection is also provided.

9 Claims, 2 Drawing Sheets

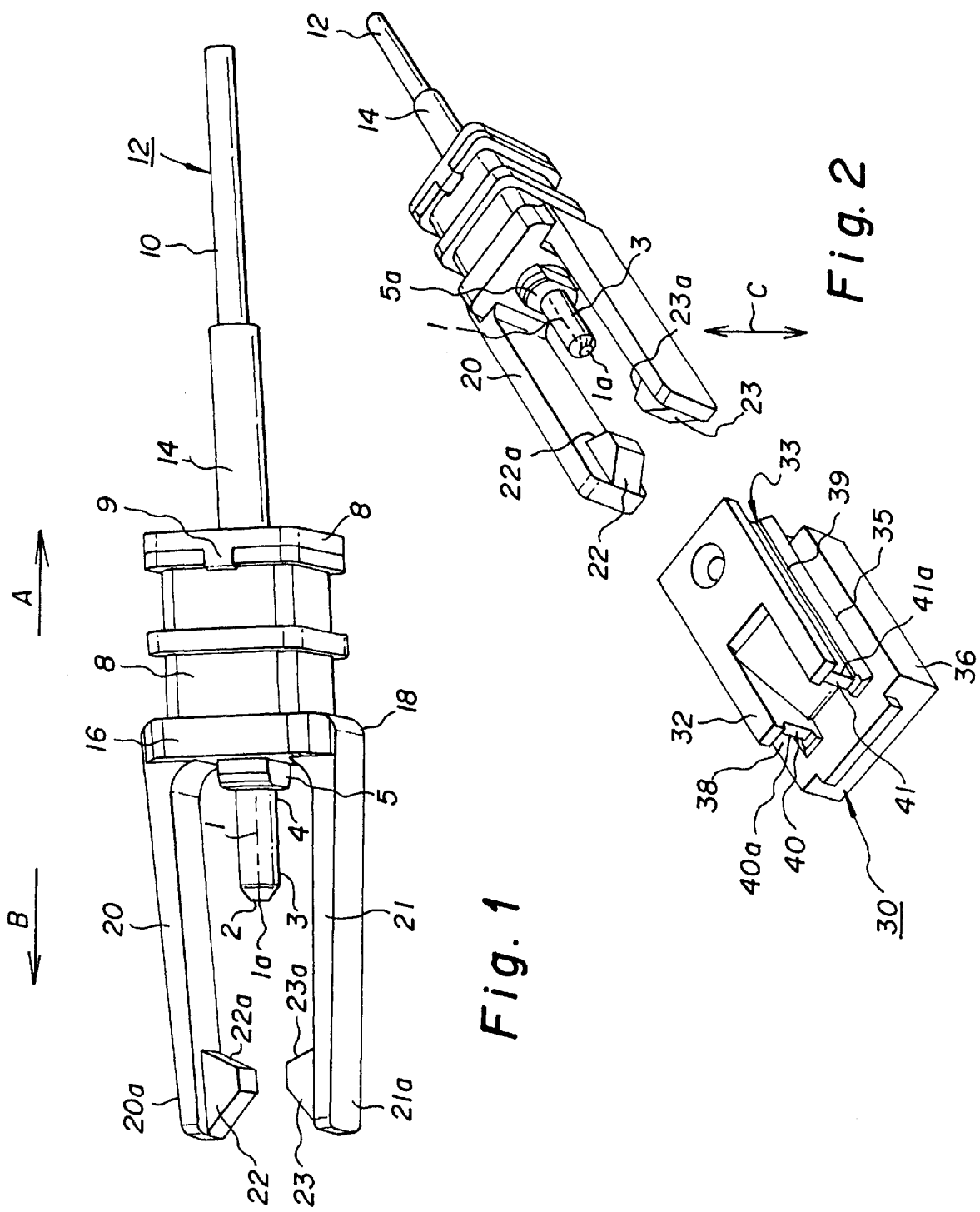

OPTICAL CONNECTOR AND OPTICAL CONNECTION

BACKGROUND OF THE INVENTION

Field of the Invention

The invention lies in the field of optical data transmission and relates to the releasable connection of light wave conductors to an associated coupling partner, especially an electrooptical module. It is possible, for example, for one or more electrooptical transducers which are to be contained in the module to be coupled optically with an end of an associated light wave conductor in each case. The term "electrooptical transducer", in the context of the present invention, is understood to be a component which, upon electrical triggering, generates optical signals (light signals), for example emitted in a range of 400 nm to about 1500 nm (hereinafter also referred to as optical transmitters), or a component which, upon impinging with optical signals, generates corresponding electrical signals (hereinafter referred to as optical receivers).

The invention relates to an optical connector for the connection of at least one light wave conductor end to a coupling partner, especially an electrooptical module, including a plug pin with a foot end and a front side, which receives the light wave conductor end for coupling and is insertable into a receiver of the coupling partner, and at least two catch arms with catch elements which hold the connector to the coupling partner in a connected state. The invention furthermore relates to an optical connection of at least one light wave conductor end to an electrooptical module.

Electrooptical modules with one or more electrooptical transducers are often contacted on printed circuit boards by soldering with electrical signal feed lines or signal branching lines. However, the heat introduced by the soldering process can damage the light wave conductor, if it is already attached to the module or is connected to the module during the assembly of the module, and accordingly endanger the functional ability of the optical data transmission. It is therefore especially desirable in the case of high-temperature soldering and automatic fabrication to be able to connect the light wave conductor to the printed circuit board only after the soldering assembly of the module. Known modules (see, for example, German Published, Non-Prosecuted Patent Application DE 33 35 529 A1 or European Patent Application 0 111 263 A2) are therefore unsuitable or can be used only with high fabrication technology expenditures, for example individual soldering of electrical connections, for such above-described temperature-critical applications, in which the light wave conductor end is already firmly attached to the module in the course of module manufacturing (so-called pigtail connection).

It is possible to basically avoid the above-described problem during the soldering assembly of a module by providing the module with a receiver (a so-called plug inlet) for the releasable connection of a plug connector, which seals off the light wave conductor end to be coupled. Such releasable light wave conductor plug connections are known (for example, see German Published, Non-Prosecuted Patent Application DE 195 33 498 A1, German Patent DE 43 11 980 C1, or German Published, Non-Prosecuted Patent Application DE 38 18 717 A1), but in all cases they involve a relatively expensively constructed plug connector constructed for many plug cycles and are made up of a large number of individual parts. For example, German Patent DE 43 11 980 C1 has an electrooptical module with a receiver for a plug pin which, for example, can be a component part of a plug connector known from German Published, Non-Prosecuted Patent Application DE 195 33 498 A1.

A connector or connection of the type mentioned at the outset appears in German Published, Non-Prosecuted Patent Application DE 38 18 717 A1. The known connector serves for the connection of two light wave conductor ends to a coupling partner which is only diagrammatically represented. The connector has a plug pin with a foot end and a front side for every light wave conductor end, at which the front surface of the light wave conductor to be coupled is sealed off. The plug pin is insertable into a receiver of the coupling partner, whereby the front side of the plug pin and thereby the light wave conductor end reach a position in which an optical connection between the light wave conductor end and, for example, the associated transducer or some other light wave conductor is assured. The plug pin is lodged in a housing and in an unconnected state is surrounded by a protective cap. In a rear region of its narrow side, the housing has catch arms with catch elements. The catch elements lock behind cooperating catch elements of the coupling partner, for example in the form of housing hooks, in a connected state.

That known plug connector is also constructed for a frequent separation and renewed connection and is accordingly constructed to be mechanically strong. That, of course, results in a comparatively high fabrication technology and extensive material expense, which ends with comparatively high piece costs. The known plug connector accordingly does not represent an economical solution for the case in which only a small number of plug exchange operations, especially only the light wave conductor connection at the time of the module assembly, must be assured.

In addition, the known connectors have a comparatively long axial structure size, which requires a correspondingly great structure space and, in the case of radial tensile loads, produces relatively large mechanical moments on the connector and the coupling partner.

SUMMARY OF THE INVENTION

It is accordingly an object of the invention to provide an optical connector and an optical connection, which overcome the hereinafore-mentioned disadvantages of the heretofore-known devices of this general type, which are easy to produce, have a small overall length and can be produced with few simple and inexpensive individual parts.

With the foregoing and other objects in view there is provided, in accordance with the invention, an optical connector for the connection of at least one light wave conductor end to a coupling partner, especially to an electrooptical module, comprising a freely lying or disposed plug pin for receiving the light wave conductor end for coupling, the plug pin to be inserted into a receiver of the coupling partner, and the plug pin having a foot end and a front side; and at least two catch arms extending from the foot end in a direction toward the front side and running at least in sections along the plug pin, the catch arms having catch elements for holding the connector to the coupling partner in a connected state.

A first essential aspect of the invention resides in the fact that, toward the front, the catch arms extending along the plug pin in at least a partial region between the foot end and the front side of the plug pin provide for a multiple function. The catch arms serve in the connected state for the definite mounting support of the connector to its coupling partner and in the unconnected state for the mechanical protection of the plug pin. This is completely sufficient, especially in the applications mentioned at the outset, in which a separation and following coupling of the light wave conductor is desired only in the manufacturing processes that are critical for the light wave conductor, especially soldering processes. Another advantageous aspect of the invention is the fact that, in spite of the protective function of the catch arms, the plug pin is readily accessible. This is desirable, especially in connection with a required cleaning of the plug or front side, for example before a renewed connection process. Due to the small number of individual components, on the whole, the connector according to the invention is distinguished by simple and cost-favorable manufacturing and a small structural height and length.

In accordance with another feature of the invention, the connection-side catch elements produce an axial prestressing of the plug pin in cooperation with catch elements of the coupling partner in the connected state. The axial prestressing can advantageously be attained especially simply by suitable dimensioning and configuration of the front side of the plug pin, on one hand, and the catch elements and their geometry on the other hand. For example, the catch elements can lock with corresponding catch elements of the coupling partner through inclined bevels, so that an axial tensile component is produced on the catch arms and thereby axial pressure on, for example, the adjoining front side of a coupling partner by way of the inclined bevels. The catch arms thereby fulfill another function in the connected state, for which otherwise additional structural elements (springs, for example) would be necessary.

In accordance with a further feature of the invention, the catch elements are disposed asymmetrically in order to make a connection possible in only a single advantageous position of the connector which, for example, can be desired if receiving several light wave conductor ends in a single plug pin or in the case of a bevel ground on the front side of the plug pin.

In accordance with an added feature of the invention, a structurally preferred limitation of the axial insertion depth of the plug pin is attained if the foot end is held by a pin bearing and a stop surface is used for limiting the axial insertion depth of the plug pin in the connected state.

In accordance with an additional feature of the invention, in order to protect the light wave conductor projecting from the connector sufficiently against breaking off (without a relevant increase in structural length and consequent increase in mechanical moments acting with radial tension), the light wave conductor end reaches the connector through a radially elastic guide sleeve.

In accordance with yet another feature of the invention, it is preferable from structural and manufacturing aspects if the catch arm legs are a U-shaped clamp having an intermediate side region to which the foot end of the plug pin is attached. The clamps can preferably be bent from a sheet-metal strip, so that the sides are thin spring plates. The foot end of the plug pin can be held by a prefabricated sheet-metal part.

With the objects of the invention in view there is also provided an optical connection for at least one light wave conductor end, comprising an electrooptical module having catch elements, guides and a receiver; a freely lying or disposed plug pin for receiving the light wave conductor end for coupling, the plug pin to be inserted into the receiver, and the plug pin having a foot end and a front side; and at least two connector-side catch arms extending out from the foot end in a direction toward the front side and running at least in sections along the plug pin, the connector-side catch arms having catch elements cooperating with the catch elements of the module in a connected state, and the connector-side catch arms guided by the guides during a connection process until reaching a locking position.

The solution of the above-mentioned task, which is the basis of the invention, is successful in the case of an optical connection according to the invention of the type mentioned at the outset, in that the catch arms extend from the foot end in the direction of the front side and at least in sections run along the freely disposed plug pin, and the module has guides which guide the catch elements on the connector side during the connection process until a locking position is reached. There guiding can advantageously take place through the use of guidance grooves provided on both sides of the module. The guidance grooves and the corresponding catch elements can thereby advantageously be disposed offset so that a connection is possible only in a preferential orientation of the connector.

In accordance with a concomitant feature of the invention, in order to be able to adjust fabrication and structurally-developed tolerances and to make the actual alignment (centering) of the light wave conductor end on the associated coupling partner or an associated transducer possible with the plug pin alone, the catch arms are held at the module in a floating configuration in the connected state.

Other features which are considered as characteristic for the invention are set forth in the appended claims.

Although the invention is illustrated and described herein as embodied in an optical connector and an optical connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is an enlarged, diagrammatic, perspective view of a connector in accordance with the invention;

FIG. 2 is an exploded, perspective view of the connector shown in FIG. 1 and a coupling partner in an unconnected (separate) state;

DESCRIPTION OF THE PREFERRED EMBODIMENTS

Figure 3:
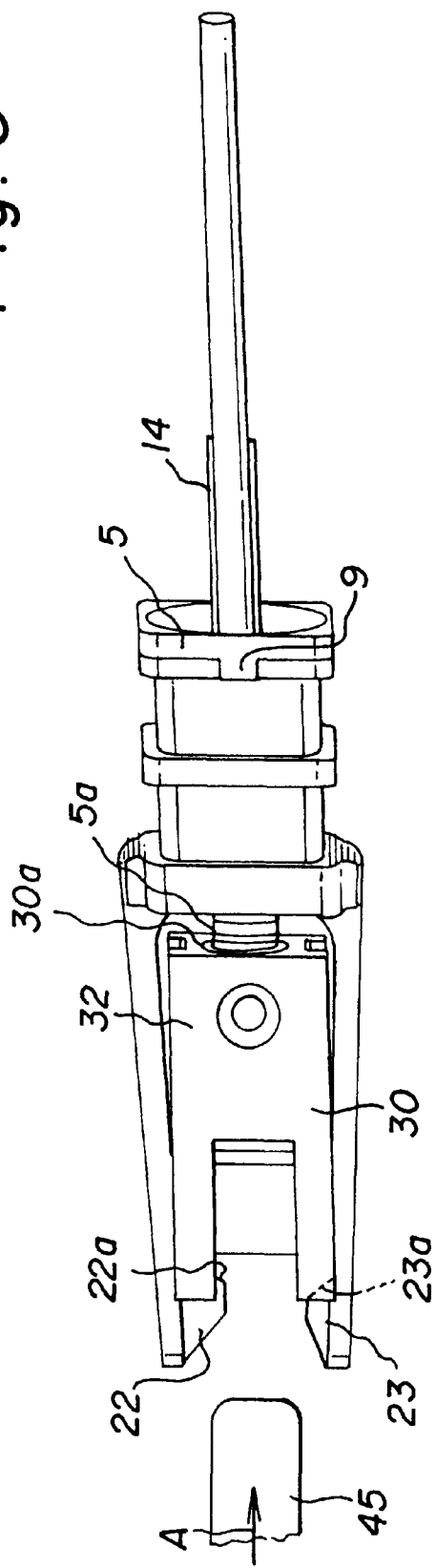
FIG. 3 is a fragmentary, perspective view of the connector in a connected state with the coupling partner according to FIG. 2.

Referring now to the figures of the drawings in detail and first, particularly, to FIG. 1 thereof, there is seen a connector for the connection of at least one light wave conductor end 1 which extends to a front side 2 of a plug pin 3. The front side 2 seals off an end surface 1a of the light wave conductor 1 that is ready for coupling. The front side 2 can be made slightly spherical and polished in a known manner. The plug pin 3 has a foot end 4 which is held in a pin bearing 5 adjacent a rear retention region 8. The pin bearing 5 passes through the retention region 8 and has a passage opening for the light wave conductor 1. The pin bearing 5 is directed over an encoder projection 9 and is locked to the retention region 8. A jacket 10 and if necessary strain relief elements of a light wave conductor cable 12 can be fastened in the retention region 8 in a manner which is known and therefore not represented in detail. Even more light wave conductors can extend in the light wave conductor cable 12 and, for example, can be sealed off jointly by the plug pin 3 which is capable of coupling. The outgoing light wave conductor cable 12 is guided by an elastic sleeve 14, which serves as a radially elastic flexible antikink bush or net. On one hand, the light wave conductor cable or the light wave conductors are thereby protected against too narrow bending radii. On the other hand, the structural length in the direction of an arrow A which determines a lever is not substantially increased in radial tensile load, because the sleeve 14 is flexible as required.

The plug pin 3 is introduced in a receptacle of a coupling partner, as will be explained in greater detail below. The receptacle can, for example, be formed of a plug inlet or plug socket of an electrooptical module.

The pin bearing 5 is connected with a base 16 of a clamp 18, for example by mechanical locking. The retention region 8 can be formed at the rear as an integral part of the clamp 18 at the base 16. The clamp 18 has an essentially U-shaped form, in which two legs project from the base 16 that serves as a connection region. The legs form catch arms 20, 21 having free ends 20a, 21a which are each provided with a catch element 22, 23 in the form of a catch projection. The catch arms accordingly extend from the foot end 4 in a direction B parallel to the plug pin 3 and run out over the front side 2 in the embodiment example. The catch arms accordingly run along the freely lying plug pin 3 and in an unconnected state serve as a protection for the plug pin 3. Consequently, the plug pin and especially its front side 2, for example, are very accessible for cleaning purposes.

In addition to the connector already explained in detail in connection with FIG. 1, FIG. 2 shows a coupling partner 30 in the form of an electrooptical module. An electrooptical transducer is disposed in a known way in the electrooptical module. The electrooptical transducer has an optically active zone on which the end surface 1a of the light wave conductor 1 is to be aligned. The term "optically active zone" thereby includes a light-emitting surface or a light-emitting region in the case of a transmitter (e.g., a laser diode) or a light-sensitive region in the case of a receiver (e.g., a photo diode). A cap 32 which can also be seen on the module acts as a "receptacle" and contains a receiver 33 in the form of a plug inlet or plug socket for the plug pin 3. After a suitable adjustment, the cap 32 can be connected to a module base 36 by welding points 35. A reference plug pin can be inserted into the receiver 33 in a known manner for the adjustment, and the position of the cap 32 in relation to the base 36 for a maximum optical coupling can be determined by active operation of the transducer.

The cap 32 is provided at each of its narrow sides with a respective guide groove 38, 39, along which one of the catch elements or projections 22, 23 glides in a connection process. The catch elements or projections 22, 23 are preferably asymmetrical in a vertical direction C, i.e., they are staggered and the grooves 38, 39 are formed with a corresponding vertical displacement. It is thereby assured that the connectors can be connected with the coupling partner 30 only in the orientation which is shown, for example, in FIG. 2. The cap 32 has locking surfaces 40, 41 on its rear side, to which the grooves 38, 39 lead.

FIG. 3 shows a connection between the connector and the coupling partner 30 which is constructed as a module. In the connected, i.e. joined state, the catch elements or projections 22, 23 grip the cap 32 behind the locking surfaces 40, 41, which accordingly form catch elements of the module 30 cooperating with the catch elements 22, 23. Since the catch surfaces 40, 41 are essentially constructed as vertical planar surfaces as is seen in FIG. 2, only a linear contact in the area of edges 40a, 41a shown in FIG. 2 exists between rear contact surfaces 22a, 23a (locking bevels) of the catch elements 22, 23 and the surfaces 40, 41. The pin bearing 5 has a stop surface 5a, which rests on a front-side insertion region 30a of the module 30, in an illustrated locked position.

An axial prestressing is produced on the catch elements or arms 22, 23 by a suitable dimensioning of the length of the plug pin 3 and the length of the catch elements or arms or the positions of the contact or locking surfaces or bevels 22a, 23a in connection with the contact or locking surfaces or bevels 22a, 23a and the edges 40a, 41a, which for its part leads to an axial contact pressure of the front side 2 or the stop surface 5a. In the case of known plug connectors, the pressure to be produced by the multifunctional catch arms is applied by additional spring elements, e.g., helical springs acting on the pin bearing.

In order to permit a floating mounting of the connector and therewith a position definition of the light wave conductor 1 only by centering in the receiver 33 shown in FIG. 2, the catch elements 22, 23 are advantageously dimensioned to have a height smaller than the depth of the grooves 38, 39. Moreover, the catch arms 20, 21 are at a distance from the cap 32.

A tool 45 which can be used for loosening the connection spreads the catch arms 20, 21 upon movement in a direction A and accordingly brings the catch elements 22, 23 out of contact with the locking surfaces or catch elements 40, 41 of the module.

Figure 4:
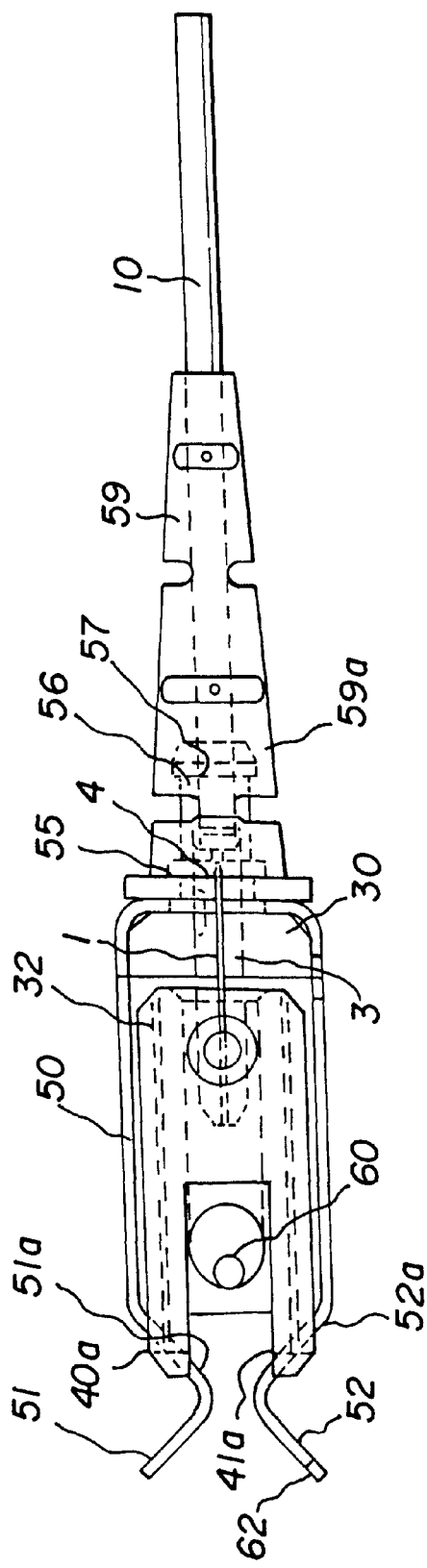
FIG. 4 is a partially transparent, elevational view of a variant with respect to the connector.

FIG. 4 shows a variant of the connector or connection in which the clamp shown in FIGS. 1 to 3 (for example, constructed as an injection die-casting part) is replaced by a metal clamp 50. The other elements in FIG. 4 which are essentially unchanged in comparison with FIGS. 1 to 3 are indicated with the same reference symbols.

The clamp 50 is prefabricated from a thin sheet-metal strip, which is bent into a U-shape recognizable in FIG. 4. Free ends 51, 52 of the U-shape are bent into an approximately V-shape, so that they essentially have a form corresponding to the catch elements 22, 23 shown in FIGS. 1 to 3 and especially so that they have corresponding locking bevels 51a, 52a. The locking bevels cooperate with the edges 40a, 41a of the cap 32 so that a stop surface 55 of a pin bearing 56 attains a definite stop of the module 30 under axial prestressing. The pin bearing 56 can, for example, also be constructed as a metal part which is provided with a passage opening 57 by a suitable metal-cutting prefabrication process. The plug pin 3 with the end 1 of the light wave conductor is received in one end of the passage opening. The passage opening 57 is penetrated at the other end by the projecting light wave conductor or jacket 10. The projecting jacket is surrounded by an antikink bush or net 59, which permits a radial bending movement due to its construction and receives the pin bearing 56 in a front-side end region 59a thereof. The end 1 of the light wave conductor (indicated in FIG. 4) in the connected state is thereby precisely aligned to an optical coupling partner, for example in the form of a spherical lens 60 within the module 30. The ends 51, 52 can be encoded by beveling or offsetting 62 so that a connection to the module is only possible in a single preferred orientation.

I claim:

1. In an optical connector for the connection of at least one light wave conductor end to a coupling partner, the improvement comprising:

a freely disposed plug pin for receiving the light wave conductor end for coupling, said plug pin to be inserted into a receiver of the coupling partner, and said plug pin having a foot end and a front side; and at least two catch arms extending from said foot end in a direction toward said front side and beyond said front side and running at least in sections along said plug pin, said catch arms forming a substantially u-shaped clamp into which the coupling partner is inserted, and said catch arms having catch elements for holding the connector to the coupling partner between said catch arms in a connected state.

2. The connector according to claim 1, wherein the coupling partner has catch elements cooperating with said catch elements of the connector to produce an axial pre-stressing of said plug pin in the connected state.

3. The connector according to claim 1, wherein said catch elements are asymmetrically disposed to assure a definite connection orientation in the connected state.

4. The connector according to claim 1, including a pin bearing holding said foot end, said pin bearing having a stop surface for limiting an axial insertion depth of said plug pin in a closed state.

5. The connector according to claim 1, including a radially elastic guide sleeve through which the light wave conductor end extends in the connector.

6. The connector according to claim 1, wherein said catch arms are legs of a U-shaped clamp having an intermediate leg region in which said foot end of said plug pin is fixed.

7. The connector according to claim 1, wherein the coupling partner is an electrooptical module.

8. In an optical connection for at least one light wave conductor end, the improvement comprising:

an electrooptical module having catch elements, guides and a receiver;

a freely disposed plug pin for receiving the light wave conductor end for coupling, said plug pin to be inserted into said receiver, and said plug pin having a foot end and a front side; and at least two connector-side catch arms extending out from said foot end in a direction toward said front side and beyond said front side and running at least in sections along said plug pin, said connector-side catch arms forming a substantially u-shaped clamp into which said electrooptical module is inserted, said connector-side catch arms having catch elements cooperating with said catch elements of said module for holding said plug pin to said electrooptical module between said catch arms in a connected state, and said connector-side catch arms guided by said guides during a connection process until reaching a locking position.

9. The connection according to claim 8, wherein said connector-side catch arms are held in a floating position at said module in a connected state.

* * * * *